United States Patent [19]
Early et al.

[11] 3,752,642
[45] Aug. 14, 1973

[54] APPARATUS FOR BRAZING
[75] Inventors: James R. Early, Hawthorne; William M. Eyring, Redondo Beach; Donald W. McGrath; Toshio Takenaka, both of Torrance, all of Calif.
[73] Assignee: The Garrett Corporation, Los Angles, Calif.
[22] Filed: Nov. 15, 1971
[21] Appl. No.: 198,906

Related U.S. Application Data
[62] Division of Ser. No. 805,502, March 10, 1969, Pat. No. 3,685,139.

[52] U.S. Cl............ 432/66, 432/67, 432/72, 432/198, 432/199, 432/205
[51] Int. Cl............................................. F27b 3/22

[58] Field of Search............ 263/2, 4, 5, 19 R, 263/52

[56] References Cited
UNITED STATES PATENTS
3,461,190  8/1969  Kemeny et al......................... 263/52
2,650,420  9/1953  True...................................... 263/2 R
3,620,513  11/1971  Wernicke............................. 263/4

Primary Examiner—John J. Camby
Attorney—Albert J. Miller et al.

[57] ABSTRACT
The brazing of materials by means of a flow of heated gas.

22 Claims, 6 Drawing Figures

Patented Aug. 14, 1973

APPARATUS FOR BRAZING

This is a divisional of application Ser. No. 805,562 filed Mar. 10, 1969, now U.S. Pat. No. 3,685,139.

BACKGROUND OF THE INVENTION

In brazing operations, a brazing filler metal, usually in the form of sheet, strip, wire, cladding, powder or the like is introduced between members of an assembly to be brazed. The brazing filler metal must be selected to have a melting point lower than any of the members to be joined and thus can melt and flow at temperatures below that which would detrimentally affect the material of the members to be joined. To obtain a sound braze joint, it is necessary that the molten brazing filler metal must wet the surface of the members to be joined. Accordingly, it may be necessary, with some materials which form an oxide coating in air which is difficult to remove, to utilize a flux to remove such an oxide.

The most commonly utilized methods of brazing materials are: torch brazing, in which heat is applied by means of a torch or other open flame; furnace brazing, in which the members to be joined are heated in air, vacuum, or non-oxidizing gases in a furnace; and dip brazing in which the assembled members are immersed in a molten salt bath. While each of these methods is capable of producing satisfactory results in certain situations, each has several inherent problems. Torch brazing is obviously limited to a single braze joint or a series of individual braze joints. Furnace brazing, while having widespread application cannot consistently achieve sufficiently uniform temperature distribution even with a circulating atmosphere within the furnace. Dip brazing introduces the problem of removal of the highly corrosive salt from the brazed assembly. Each of these problems or limitations is compounded by the present trend toward the brazing of denser more complex assemblies, thin gage materials, smaller tubular members, and the like.

SUMMARY OF THE INVENTION

The present invention discloses a novel method of and apparatus for brazing which utilizes the flow of a heated gas to accomplish the brazing of an assembly. Forced convection brazing, as the process of the present invention has been designated, involves heating a brazing gas and then passing the heated gas through a brazing chamber containing the assembly to be brazed. A pressure differential is created across the brazing chamber in order to establish this flow of heated gas through the brazing chamber. Conventional heating and gas pumping apparatus can be utilized.

To conserve the gas and provide greater purification, closed loop forced convection brazing can be accomplished by cycling the exhaust from the brazing chamber to the inlet of the pumping means. Various by-passes and controls along with other elements to conserve heat energy can be added to the closed loop to assist in start-up of the loop and to promote cycle operation and efficiency.

DETAILED DESCRIPTION OF INVENTION

Figure 1:
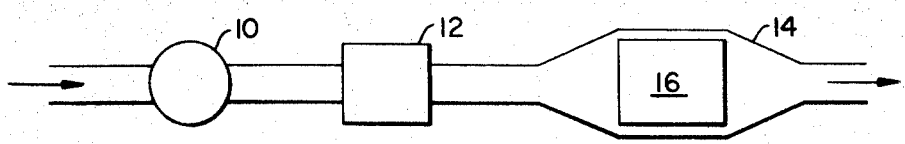
FIG. 1 is a schematic flow diagram of a forced convection brazing cycle.

As shown in FIG. 1, the basic forced convection brazing cycle of the present invention comprises a pressurizer 10, a heater 12, and a brazing chamber 14. The material to be brazed, such as a heat exchanger core assembly 16, is enclosed within the brazing chamber 14.

The pressurizer 10 such as a conventional pump or compressor receives a flow of a gaseous fluid and raises its pressure to a level sufficient to cause its flow through the remainder of the braze cycle. The noble gases, such as helium, neon, argon, krypton, and xenon are suitable inert or non-oxidizing gases available for this brazing cycle. Other non-oxidizing gases such as hydrogen, or nitrogen can be utilized in many circumstances. Also, there will be situations where a reactive gas such as chlorine, either alone or in combination with a suitable non-oxidizing gas, may be desirable.

After being raised in pressure, the pressurized gas can be heated to a brazing temperature in any conventional manner. For example, the heater 12 may include resistance heated elements, elements heated by induction coils or quartz lamps, or other equivalent means. The gas may likewise be indirectly heated by passing it through a heat exchanger.

The flow of the heated, pressurized gas through the assembly 16 in the brazing chamber 14 will accomplish the brazing of the assembly 16. After passing through the assembly 16, the gas is exhausted from the brazing chamber 14.

While the flow of gas is maintained in FIG. 1 by a pressurizer 10, it can also readily be maintained by a suction device such as a jet pump on the opposite side of the brazing chamber 14. To maintain flow, it is only important that the pressure at the inlet end of the brazing chamber 14 be greater than the pressure at the outlet end. This pressure differential can be accomplished by increasing pressure at the inlet end, decreasing pressure at the outlet end, or a combination of both of these.

Figure 2:
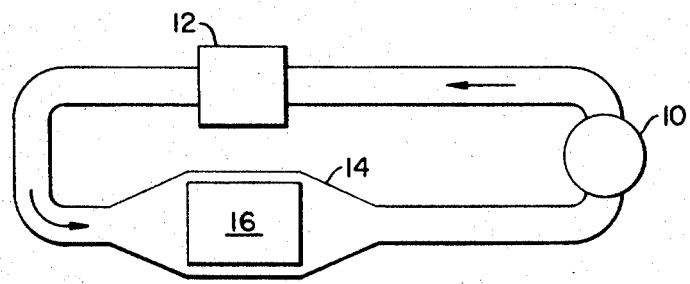
FIG. 2 is a schematic flow diagram of a closed loop forced convection brazing cycle.

To provide for the more efficient utilization of heat and gas, forced convection brazing can be accomplished in a closed loop as illustrated in FIG. 2. The loop is closed by connecting the exhaust of the brazing chamber 14 to the inlet of the pressurizer 10.

Figure 3:
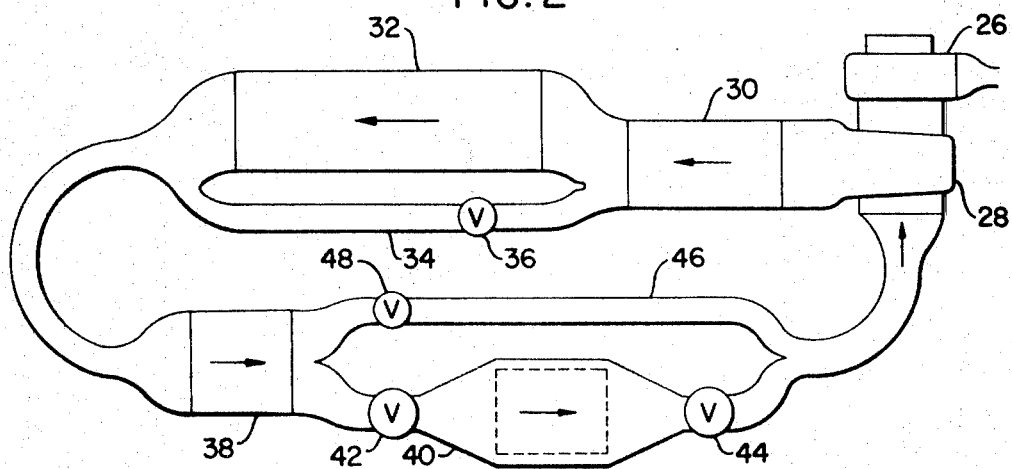
FIG. 3 is a schematic flow diagram of an alternate embodiment of a closed loop forced convection brazing cycle.

The closed loop for forced convection brazing can be modified as indicated in FIG. 3. A compressor 28, driven by a motor or turbine 26 provides pressurization for the brazing gas which is raised above the brazing temperature in heater 30. A purifier 32 receives the heated gas and serves to remove impurities and other undesirable constituents from the brazing gas. Depending upon the nature of the brazing gas, chips or sponge of titanium, copper, or molecular sieve reactive or sorptive materials or combinations thereof can be utilized in the purifier to remove such undesirable brazing gas constituents as oxygen, water vapor, residual solvents, oil vapor, etc. A purifier by-pass line 34 having a valve 36 provides a by-pass for the brazing gas around the purifier 32.

A cooler 38 such as a heat exchanger receives the purified, heated brazing gas and reduces its temperature to the desired brazing temperature before the gas is admitted to the brazing chamber 40. Valves 42 and 44 control the inlet and outlet, respectively, of the brazing chamber 40. A brazing chamber by-pass line 46 including a valve 48 permits flow around the brazing chamber 40.

Figure 4:
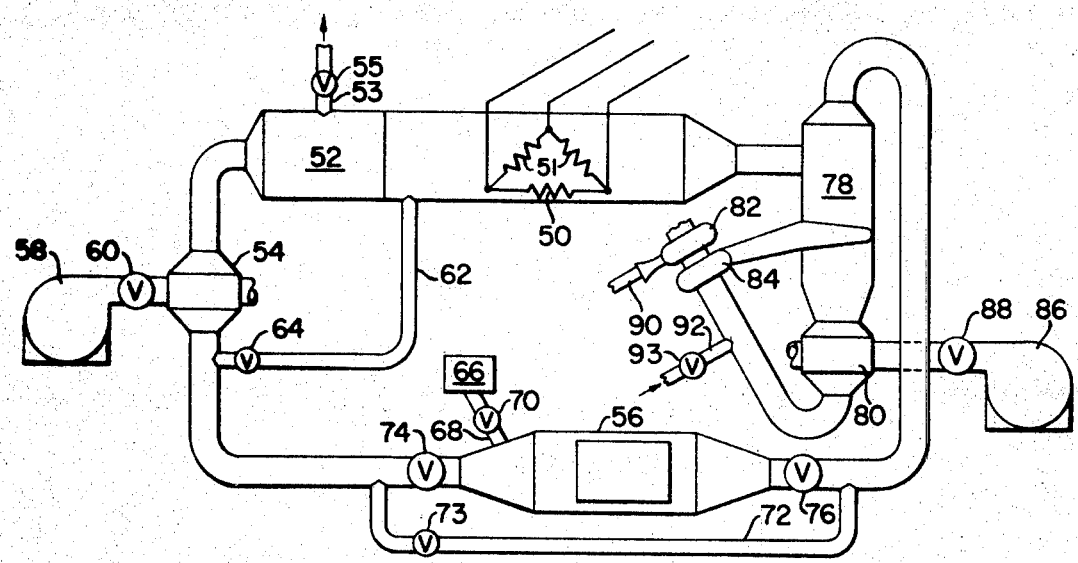
FIG. 4 is a schematic flow diagram of another alternate embodiment of a closed loop forced convection brazing cycle.

A further embodiment of the closed loop is illustrated in FIG. 4. The loop includes a heater 50 having a heat source such as tungsten carbide electrical resistance elements 51 for heating the brazing gas, a purifier 52 to remove impurities and water vapor from the heated brazing gas, and a cooler 54 to control the temperature of the brazing gas before it enters the brazing chamber 56. The cooler 54 may include an air blower 58 having its flow controlled by valve 60. A by-pass line 62 having valve 64 provides a by-pass around the purifier 52 and cooler 54 to permit a fast introduction of heated brazing gas to the brazing chamber 56. Also the purifier 52 may be provided with a vent 53 including a valve 55.

A vacuum pump 66 is connected to the brazing chamber 56 by line 68 having valve 70. A brazing chamber by-pass 72 having valve 73 permits a by-pass of the brazing chamber 56. Valves 74 and 76 are positioned at the inlet and outlet, respectively, of the brazing chamber 56. After passing through the brazing chamber 56, the brazing gas passes through a recuperator 78 and heat sink 80, turbine 82 driven compressor 84, and back through the opposite side of the recuperator 78 before returning to the heater 50. An air blower 86 with its flow controlled by valve 88 can provide the cooling air for heat sink 80. A compressed air line 90 from a source of compressed air (not shown) will provide motive power for the turbine 82. Make up brazing gas can be addd to the loop through the make up line 92 having valve 93.

In operation, once the assembly to be brazed is positioned within the brazing chamber 56, the closed loop with all valves open is first evacuated by means of the vacuum pump 66. The loop is then purged with argon or some other brazing gas introduced through line 92 and vented through vent 53. The turbine 82 is then started to drive the compressor 84 and the vent 53 is closed by valve 55. Valve 64 is then closed in the by-pass 62 and the heater 50 is turned on to heat the argon. When the argon temperature at the brazing chamber 56 has reached an intermediate value, say 400° F, the valves 74 and 76 are closed. The temperature will continue to rise in the loop until the temperature at the brazing chamber by-pass reaches the brazing temperature, for example, 1,100° F. The cooler 54 is then utilized to bring the argon temperature back down to the intermediate value of 400° F by turning on blower 58 with valve 60 open.

At this point, brazing chamber by-pass valve 73 is closed and valves 74 and 76 opened. By controlling the blower valve 60 and the blower 58, the temperature at the brazing chamber can be raised to and stabilized at the brazing temperature of 1,100° for the period of time required for brazing. Once brazing has been accomplished, the loop can be cooled by turning off the heater 50, opening blower valve 60 to its maximum and opening all loop valves.

The recuperator 78 and heat sink 80 are provided to decrease the argon temperature to an acceptable temperature before compression in the compressor 84. The argon will recover a portion of this heat during the compression process and in passing through the other side of the recuperator 78 before entering the heater 50.

Forced convection brazing, either open or closed loop is generally applicable to all brazing materials. It is, however, especially suited to the fluxless brazing of aluminum and its alloys, stainless steel or superalloy heat exchanger cores.

Figure 5:
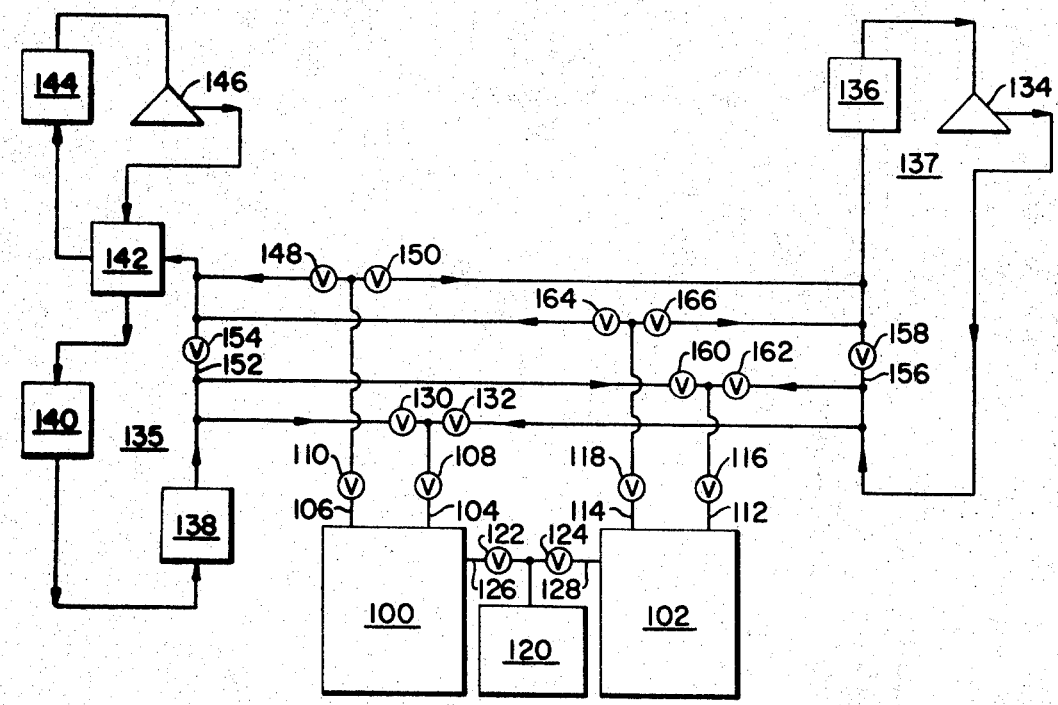
FIG. 5 is a schematic flow diagram of yet another alternate embodiment of a closed loop forced convection brazing cycle.

A forced convection brazing cycle specifically designed for the brazing of aluminum heat exchanger cores is shown in FIG. 5. As indicated, there are two brazing chambers 100 and 102 in this cycle. The inlet 104 and outlet 106 of brazing chamber 100 are controlled by open or shut valves 108 and 110, respectively; likewise, the inlet 112 and outlet 114 of brazing chamber 102 are controlled by inlet valve 116 and outlet valve 118. Vacuum pump 120 is connected to both chambers 100 and 102 by means of lines 126 and 128, respectively. Open/close valves 122 and 124, respectively, control access to the chambers in these lines. The inlet of the brazing chamber 100 receives a flow of hot gas from a hot loop 135 controlled by adjustable valve 130 and a flow of cold gas from a cold loop 137 controlled by adjustable valve 132. The cold loop comprises a compressor 134 and cooler 136.

The flow of hot gas through valve 130 is received from the hot loop which comprises a titanium chip filter 138, heater 140, recuperator 142, cooler 144 and compressor 146. The outlet of brazing chamber 100 can exhaust gases to either the recuperator 142 or cooler 136. Control of gas to the recuperator 142 is maintained by valve 148 while control of gas to the cooler 136 is maintained by valve 150. Exhaust gases received by the recuperator are passed through the recuperator 142 to the cooler 144, and then to the compressor 146 and are then passed through the other side of the recuperator 142. These gases are heated in the heater 140 and purified in the filter 138 before proceeding to the inlet 104 of the brazing chamber 100. A by-pass line 152 from the filter 138 to the recuperator 142 is controlled by valve 154. A second by-pass line 156 from the compressor 134 to the cooler 136 is controlled by valve 158.

Brazing chamber 102 is connected to the loop elements in a similar fashion to brazing chamber 100. Valves 160 and 162 control the flow of hot gas and cold gas to the inlet while valves 164 and 166 control the distribution of the outlet gas from the brazing chamber 102.

Operation of the closed loop of FIG. 5 is similar to operation of the FIG. 4 loop. Temperature control is achieved by mixing hot gas with cold gas in various proportions by the manipulation of the control valves.

Figure 6:
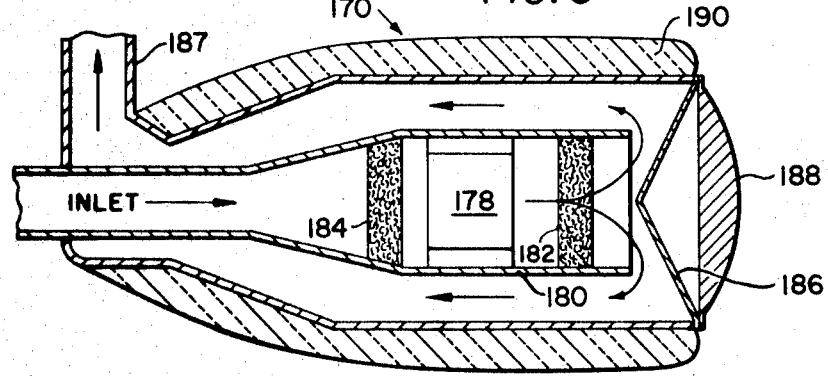
FIG. 6 is a cross-sectional view of a reverse flow brazing chamber.

In operation, the brazing chamber in any of the forced convection brazing cycle configurations may be constructed with a reverse flow. A reverse flow chamber 170, such as illustrated in FIG. 6, is utilized to obtain a more uniform temperature distribution across the assembly to be brazed. The assembly 178 such as a heat exchanger core is contained in an inner chamber 180. Heat reflecting chips 182 and 184 are positioned on either side of the assembly 178. A deflection plate 186 positioned at the outlet of the inner chamber 180 will direct the flow of the still heated gases around the inner chamber 180 and then out the outlet 187. A door 188 provides access to the inner chamber 180. Insulation 190 is provided around the brazing chamber to facilitate maintenance of the uniform temperature.

It should be recognized that many modifications can be made to the brazing cycle without departing from the spirit and scope of the present invention. The selection of specific process components and parameters will be basically governed by the materials to be brazed. Many possible combinations of brazing fluids, brazing materials, and cycle parameters are possible.

What is claimed is:

1. Brazing apparatus comprising:
 means for pressurizing a brazing gas;
 heating means operably associated with said pressurizing means to receive pressurized brazing gas and to heat the pressurized brazing gas to a brazing temperature; and
 a brazing chamber operably associated with said heating means to enclose an assembly to be brazed and to receive the heated brazing gas from said heating means, said heating means separate from said brazing chamber to heat the pressurized brazing gas before said heated brazing gas is received by said brazing chamber to braze the assembly enclosed within said brazing chamber, said pressurizing means receiving the entire flow of brazing gas from said brazing chamber to complete a substantially closed loop.

2. The brazing apparatus of claim 1 and in addition by-pass means operably associated with said brazing chamber to by-pass brazing gas around said brazing chamber.

3. Brazing apparatus comprising:
 a brazing gas;
 a compressor to increase the pressure of said brazing gas;
 a heater operably associated with said compressor to receive said compressed brazing gas and to heat said brazing gas to a brazing temperature; and
 a brazing chamber operably associated with said heater and said compressor to enclose an assembly to be brazed and to receive said heated, compressed brazing gas from said heater, said heater separate from said brazing chamber and comprising means to heat the brazing gas before said heated, compressed brazing gas enters said brazing chamber to braze the assembly enclosed therein, said compressor to receive the entire flow of brazing gas from said brazing chamber to complete a substantially closed loop.

4. The brazing apparatus of claim 3 wherein said brazing gas is selected from the group consisting of helium, neon, argon, krypton, xenon, hydrogen, and nitrogen.

5. The brazing apparatus of claim 3 wherein at least a portion of the brazing gas is reactive with the assembly to be brazed.

6. The brazing apparatus of claim 3 and in addition a brazing gas purifier operably associated with said heater and said brazing chamber to receive said heated brazing gas from said heater, said brazing chamber to receive the entire flow of said purified, heated brazing gas from said purifier.

7. Brazing apparatus comprising:
 a brazing gas;
 a compressor to increase the pressure of said brazing gas;
 a heater operably associated with said compressor to receive said compressed brazing gas and to heat said brazing gas to a brazing temperature;
 a brazing gas purifier operably associated with said heater to receive heated brazing gas from said heater;
 a brazing chamber operably associated with said brazing gas purifier and said compressor to enclose an assembly to be brazed and to receive said purified, heated, compressed brazing gas from said purifier, said compressor to receive the brazing gas from said brazing chamber to complete a substantially closed loop; and
 first by-pass means operably associated with said purifier to by-pass brazing gas around said purifier and second by-pass means operably associated with said brazing chamber to by-pass brazing gas around said brazing chamber.

8. Brazing apparatus comprising:
 a brazing gas;
 a compressor to increase the pressure of said brazing gas;
 a heater operably associated with said compressor to receive said compressed brazing gas and to heat said brazing gas above a brazing temperature;
 a brazing gas purifier operably associated with said heater to receive heated brazing gas from said heater;
 a cooler operably associated with said purifier to receive the heated, purified brazing gas from said purifier and reduce the temperature of said brazing gas to the brazing temperature and
 a brazing chamber operably associated with said brazing gas purifier and said compressor to enclose an assembly to be brazed and to receive said purified, heated, compressed brazing gas from said purifier, said compressor to receive the entire flow of brazing gas from said brazing chamber to complete a substantially closed loop.

9. The brazing apparatus of claim 8 and in addition recuperator means operably associated with said brazing chamber, said compressor, and said heater, said recuperator to receive the entire flow of brazing gas from said brazing chamber and to remove heat therefrom before said brazing gas is compressed in said compressor and transfer at least a portion of the heat removed to said brazing gas after said brazing gas has been compressed and before said brazing gas is heated in said heater.

10. The brazing apparatus of claim 9 wherein said brazing chamber includes flow reversing means to direct the flow of heated brazing gas around the assembly to be brazed after the brazing gas has flowed through the assembly to be brazed.

11. The brazing apparatus of claim 10 wherein said flow reversing means comprises an inner chamber within said brazing chamber to enclose the assembly to be brazed and to receive the heated brazing gas and baffle means within said brazing chamber to reverse the flow of heated brazing gas around the exterior of said inner chamber after the brazing gas has passed through said inner chamber.

12. The brazing apparatus of claim 11 and in addition porous, heat reflecting means positioned within said inner chamber on both sides of the assembly to be brazed.

13. Brazing apparatus comprising:
a brazing gas;
a heater to heat said brazing gas above a brazing temperature;
a purifier operably associated with said heater to receive said heated brazing gas and to purify said heated brazing gas;
a cooler operably associated with said purifier to receive said heated, purified brazing gas and to cool the gas to a brazing temperature;
a first by-pass conduit operably associated with said purifier and said cooler to by-pass brazing gas around said purifier and said cooler, valve means operably associated with said first by-pass conduit to control the flow of brazing gas therethrough;
a brazing chamber operably associated with said cooler and said first by-pass conduit to receive brazing gas from said cooler and said first by-pass conduit, said brazing chamber to enclose an assembly to be brazed;
a recuperator having a cooling side and a heating side operably associated with said brazing chamber, the cooling side receiving brazing gas from said brazing chamber to remove heat from said brazing gas; and
a compressor operably associated with said recuperator to receive brazing gas from the cooling side of said recuperator and to increase the pressure of said brazing gas;
the heating side of said recuperator receiving brazing gas from said compressor to heat the brazing gas;
said heater receiving brazing gas from said heating side of said recuperator to complete a substantially closed loop.

14. The brazing apparatus of claim 13 and in addition a second by-pass conduit operably associated with said brazing chamber to by-pass brazing gas around said brazing chamber and valve means operably associated with said brazing chamber and said second by-pass conduit to control the flow of brazing gas therethrough.

15. The brazing apparatus of claim 13 and in addition evacuation means operably associated with said brazing chamber to evacuate gas from said brazing chamber and the substantially closed loop.

16. Brazing apparatus comprising:
a brazing chamber to enclose an assembly to be brazed;
a hot brazing gas loop associated with said brazing chamber to supply hot brazing gas to said brazing chamber at a temperature above a brazing temperature;
a cold brazing gas loop operably associated with said brazing chamber to supply cold brazing gas to said brazing chamber; and
valve means operably associated with said hot loop and said cold loop to control the mixture of hot and cold brazing gas to said brazing chamber.

17. The brazing apparatus of claim 15 wherein said hot brazing loop comprises:
a recuperator having a cooling side and a heating side, the cooling side receiving brazing gas from said brazing chamber to remove heat from said brazing gas;
a cooler operably associated with cooling side of said recuperator to further remove heat from said brazing gas;
a compressor operably associated with said cooler to receive the cooled brazing gas from said cooler to increase the pressure of said brazing gas;
the heating side of said recuperator operably associated with said compressor to receive the pressurized brazing gas and to heat the brazing gas;
a heater operably associated with said heating side of said recuperator to receive the brazing gas and to further heat the brazing gas to above a brazing temperature, and
a purifier operably associated with said heater to receive heated brazing gas and to purify the heated brazing gas,
said brazing chamber receiving heated purified brazing gas from said purifier;
and said cold brazing loop comprises:
a cooler receiving brazing gas from said brazing chamber to remove heat from said brazing chamber; and
a compressor operably associated with said cooler to receive brazing gas from said cooler to increase the pressure of said brazing gas;
said brazing chamber receiving pressurized brazing gas from said compressor.

18. The brazing apparatus of claim 17 and in addition evacuation means operably associated with said brazing chamber to evacuate gas from said brazing chamber and said hot and cold brazing loops.

19. The brazing apparatus of claim 17 wherein said brazing chamber includes flow reversing means comprising:
an inner chamber within said brazing chamber to enclose the assembly to be brazed and to receive the heated brazing gas; baffle means within said brazing chamber to reverse the flow of heated brazing gas around the exterior of said inner chamber after the brazing gas has passed through said inner chamber; and heat reflecting means positioned within said inner chamber on both sides of the assembly to be brazed.

20. Brazing apparatus comprising:
a brazing gas; increase
a compressor to increase the pressure of said brazing gas;
a heater operably associated with said compressor to receive said compressed brazing gas and to heat said brazing gas to a brazing temperature;
a brazing gas purifier operably associated with said heater to receive heated brazing gas from said heater;
a brazing chamber operably associated with said brazing gas purifier and said compressor to enclose an assembly to be brazed and to receive said purified, heated, compressed brazing gas from said purifier, said compressor to receive the brazing gas from said brazing chamber to complete a substantially closed loop; and
by-pass means operably associated with said purifier to by-pass brazing gas around said purifier.

21. Brazing apparatus comprising:
a brazing gas;

a compressor to increase the pressure of said brazing gas;

a heater operably associated with said compressor to receive said compressed brazing gas and to heat said brazing gas to a brazing temperature;

a brazing gas purifier operably associated with said heater to receive heated brazing gas from said heater;

a brazing chamber operably associated with said brazing gas purifier and said compressor to enclose an assembly to be brazed and to receive said purified, heated, compressed brazing gas from said purifier, said compressor to receive the brazing gas from said brazing chamber to complete a substantially closed loop; and by-pass means operably associated with said brazing chamber to by-pass brazing gas around said brazing chamber.

22. A braze cycle comprising:

a brazing gas;

a heater to heat said brazing gas above a brazing temperature;

a purifier operably associated with said heater to receive said heated brazing gas and to purify said heated brazing gas;

a cooler operably associated with said purifier to receive said heated, purified brazing gas and to cool the gas to a brazing temperature;

a brazing chamber operably associated with said cooler to receive brazing gas from said cooler, said brazing chamber to enclose an assembly to be brazed;

a by-pass conduit operably associated with said brazing chamber to by-pass brazing gas around said brazing chamber and valve means operably associated with said by-pass conduit to control the flow of brazing gas therethrough;

a recuperator having a cooling side and a heating side operably associated with said brazing chamber, the cooling side receiving brazing gas from said brazing chamber to remove heat from said brazing gas; and a compressor operably associated with said recuperator to receive brazing gas from the cooling side of said recuperator and to increase the pressure of said brazing gas;

the heating side of said recuperator receiving brazing gas from said compressor to heat the brazing gas;

said heater receiving brazing gas from said heating side of said recuperator to complete a substantially closed loop.

* * * * *